United States Patent
Kurisu

(10) Patent No.: US 10,630,882 B2
(45) Date of Patent: Apr. 21, 2020

(54) IMAGE PICKUP APPARATUS HAVING FUNCTION OF CORRECTING DEFOCUSING AND METHOD FOR CONTROLLING THE SAME

(71) Applicant: CANON KABUSHIKI KAISHA, Tokyo (JP)

(72) Inventor: Hiroaki Kurisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/132,912

(22) Filed: Sep. 17, 2018

(65) Prior Publication Data
US 2019/0089892 A1 Mar. 21, 2019

(30) Foreign Application Priority Data
Sep. 21, 2017 (JP) .................................. 2017-181112

(51) Int. Cl.
H04N 5/232 (2006.01)
G02B 13/00 (2006.01)
G02B 27/00 (2006.01)
H04N 5/369 (2011.01)

(52) U.S. Cl.
CPC ....... *H04N 5/23212* (2013.01); *G02B 13/009* (2013.01); *G02B 27/0025* (2013.01); *H04N 5/232122* (2018.08); *H04N 5/36961* (2018.08)

(58) Field of Classification Search
CPC ......... H04N 5/23212; H04N 5/232122; H04N 5/36961; G02B 27/0025; G02B 13/009
See application file for complete search history.

(56) References Cited

U.S. PATENT DOCUMENTS

| 2011/0013894 A1* | 1/2011 | Takaiwa | H04N 5/23212 396/48 |
| 2015/0256738 A1* | 9/2015 | Inoue | H04N 5/23212 348/362 |
| 2016/0147040 A1* | 5/2016 | Watanabe | G03B 3/10 396/81 |
| 2017/0272643 A1* | 9/2017 | Tamaki | H04N 5/23212 |
| 2018/0063416 A1* | 3/2018 | Kimoto | H04N 5/23245 |

FOREIGN PATENT DOCUMENTS

JP 2005352043 A 12/2005

* cited by examiner

*Primary Examiner* — Gevell V Selby
(74) *Attorney, Agent, or Firm* — Rossi, Kimms & McDowell LLP

(57) ABSTRACT

An image pickup apparatus corrects defocusing caused by an aperture difference to prevent degradation in AF focusing accuracy. In the image pickup apparatus, an image shift amount is detected based on a pair of picture signals by a phase difference AF method. When a first aperture at a time of a focus detection operation for detecting an image shift amount by a focus detection unit differs from a second aperture at a time of an image shooting operation for recording an image signal acquired from an image pickup device, a correction amount of a position of a focus lens due to a difference between a first aperture and a second aperture is calculated, by using a correction amount acquired from a first storage unit and a difference in the position of the focus lens between the first aperture and the second aperture acquired from a second storage unit.

5 Claims, 8 Drawing Sheets

IMAGE PICKUP APPARATUS HAVING FUNCTION OF CORRECTING DEFOCUSING AND METHOD FOR CONTROLLING THE SAME

BACKGROUND OF THE INVENTION

Field of the Invention

The present invention relates to an image pickup apparatus having a function of correcting defocusing that occurs according to an aperture difference and a method for controlling the same.

Description of the Related Art

Conventionally, in an image pickup apparatus such as an electronic still camera, as a method for moving a focus lens position to focus on a subject, an autofocus control (AF control) that automatically performs a focusing operation using an image signal from an image pickup device is used. If an aperture is changed after the focusing operation of the AF control, a defocused or blurred image may be shot.

In Japanese Laid-Open Patent Publication (kokai) No. 2005-352043, in order to correct defocusing caused by an aperture difference as described above, correction values for a plurality of apertures are written in the camera and correction is performed according to the aperture at a time of image shooting to improve focusing accuracy.

However, according to the related art disclosed in Japanese Laid-Open Patent Publication (kokai) No. 2005-352043 described above, when making correction values for correcting defocusing caused by the aperture difference, it is necessary to perform bracket shooting and store a lens position at which the subject is in best focus for each aperture (hereinafter referred to as "the best focus"). At this time, to improve the accuracy of calculation of the best focus, the processing time becomes longer for the following points (1) to (3).

(1) It is necessary to increase sampling of bracket shooting.

(2) To calculate best focus (position where a high-frequency component peaks), it is necessary to perform a multiple order approximation.

(3) To reduce optical defocusing (defocusing caused by lens aberration), it is necessary to read a non-added image similar to a still image and to perform a process for evaluating best focus in a high-frequency band.

Therefore, creating a correction value for each individual during mass production will lead to an increase in adjustment time with decreased productivity.

Furthermore, in an image pickup apparatus or the like with an attached lens, even if an adjustment is made based on optical characteristics of a sensor before mounted in a housing, adjusted values may shift during housing assembly.

SUMMARY OF THE INVENTION

The present invention aims to correct defocusing caused by an aperture difference more accurately and efficiently to prevent degradation in AF focusing accuracy.

In an aspect to the present invention, there is provided with an image pickup apparatus comprising: n image pickup device configured to photoelectrically convert a light flux having passed through mutually different pupil areas of an image pickup optical system including a focus lens to output a pair of picture signals; a focus detection unit configured to detect an image shift amount based on the pair of picture signals by a phase difference AF method; a diaphragm control unit configured to control an aperture of a diaphragm included in the image pickup optical system; a first storage unit configured to store a correction amount for correcting optical defocusing caused by an aberration of the image pickup optical system in accordance with the aperture; a second storage unit configured to store a difference between a position of the focus lens at which the image shift amount in the phase difference AF becomes zero for a predetermined aperture, and a position of the focus lens at which the image shift amount in the phase difference AF becomes zero for each aperture; and a calculation unit configured to calculate, when a first aperture at a time of a focus detection operation for detecting the image shift amount by the focus detection unit differs from a second aperture at a time of an image shooting operation for recording an image signal acquired from the image pickup device, the correction amount of the position of the focus lens due to a difference between the first aperture and the second aperture, by using the correction amount acquired from the first storage unit and the difference in the position of the focus lens between the first aperture and the second aperture acquired from the second storage unit.

According to the present invention, it is possible to prevent degradation in the AF focusing accuracy and to shorten time required for acquiring correction values for correcting defocusing generated according to the aperture difference.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

[Configuration of Image Pickup Apparatus]

Figure 1:
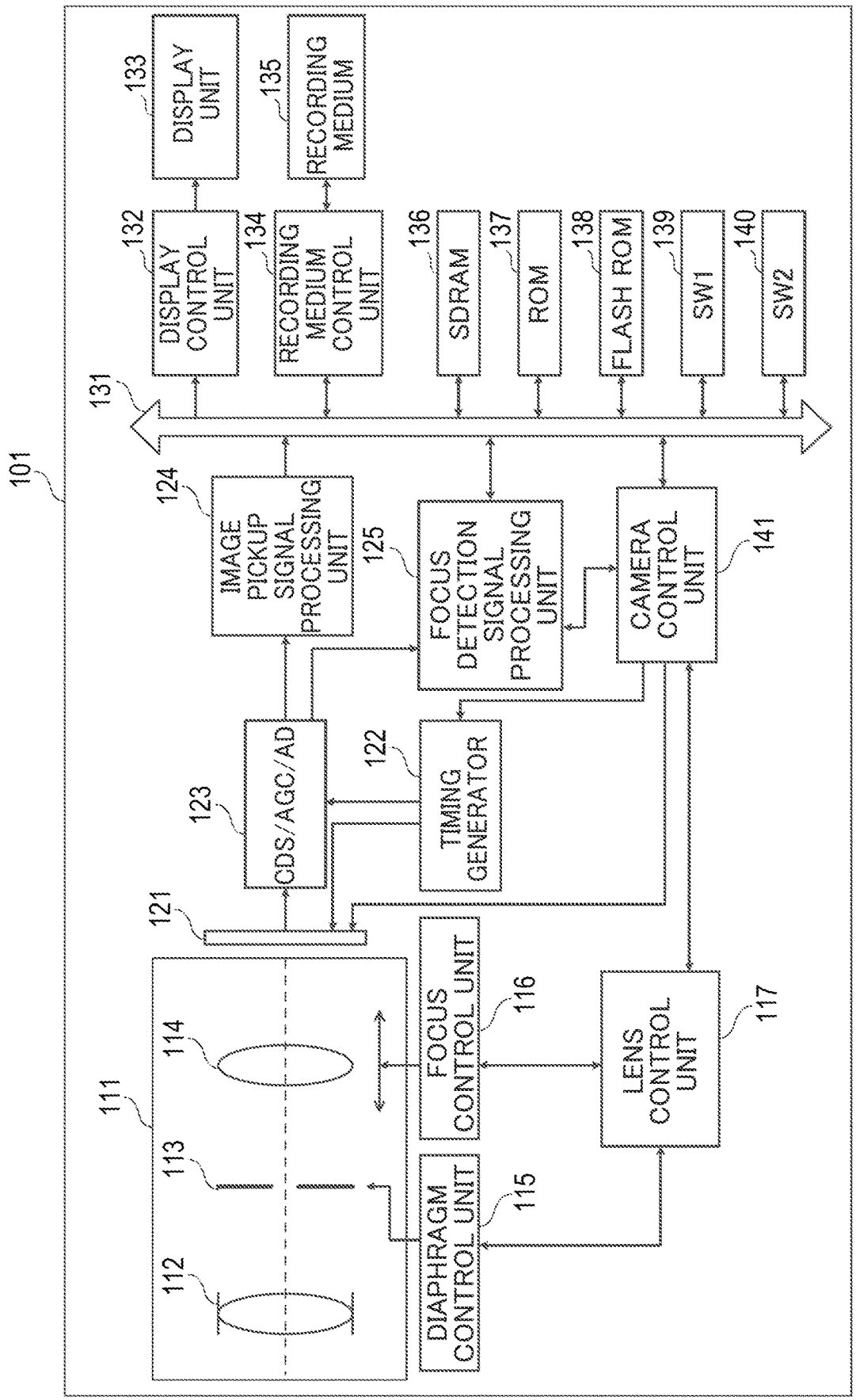
FIG. 1 is a block diagram showing a configuration of an image pickup apparatus.

FIG. 1 is a block diagram showing a configuration of an image pickup apparatus 101.

A taking lens 111 includes an image pickup optical system such as a fixed lens 112, a diaphragm 113, and a focus lens 114. By driving the diaphragm 113, a diaphragm control unit 115 adjusts an opening diameter of the diaphragm 113 to adjust a light amount at a time of image shooting. A focus control unit 116 determines a drive amount for driving the focus lens 114 based on a shift amount in an optical axis direction of the taking lens 111. Then, by driving the focus lens 114, the focus control unit 116 performs focusing. Movement control of the focus lens 114 by the focus control unit 116 implements automatic focusing control. The focus lens 114 is a lens for focusing and usually includes a plurality of lenses, although FIG. 1 simply shows the focus lens 114 with a single lens. The diaphragm control unit 115 and the focus control unit 116 are controlled by a lens control unit 117 based on a control instruction of a camera control unit 141.

A light flux incident through this image pickup optical system forms an image on a light-receiving surface of an image pickup device 121, and is photoelectrically converted into an electric signal by a photoelectric conversion element provided in the image pickup device 121. A signal charge accumulated in each photoelectric conversion element is sequentially read from the image pickup device 121 by drive pulses output from a timing generator 122 as an image signal, which is a voltage signal in proportion to the signal charge.

A CDS/AGC/AD converter 123 performs correlated double sampling for eliminating reset noise, adjustment of a sensor gain, and digitizing signals on the image signal and a focus detection signal (a pair of picture signals) read from the image pickup device 121. The CDS/AGC/AD converter 123 outputs the image signal to an image pickup signal processing unit 124. The CDS/AGC/AD converter 123 outputs the focus detection signal of a phase difference AF method on an image pickup surface to a focus detection signal processing unit 125. The focus detection signal processing unit 125 sets and arranges a focus detection region for performing focus detection in the image pickup screen. Also, the focus detection signal processing unit 125 performs correlation calculation on the pair of picture signals for focus detection output from the CDS/AGC/AD converter 123. Then, the focus detection signal processing unit 125 calculates information such as a defocus amount, reliability information (two-image coincidence, two-image steepness, contrast information, saturation information, scratch information, and the like).

The image pickup signal processing unit 124 stores the image signal output from the CDS/AGC/AD converter 123 in an SDRAM 136 via a bus 131. The image signal stored in the SDRAM 136 is read by a display control unit 132 via the bus 131 and displayed on a display unit 133. In an operation of recording the image signal, the image signal stored in the SDRAM 136 is recorded on a recording medium 135 by a recording medium control unit 134.

Information such as a control program to be executed by the camera control unit 141 and various data required for the control are stored in the ROM 137. Various pieces of setting information regarding the operation of the camera body 101 such as user setting information are stored in a flash ROM 138.

An operation member 139 is an image shooting preparation switch for instructing an image shooting standby operation such as AF and AE (hereinafter referred to as "the SW 1"). An operation member 140 is an image shooting switch for instructing image shooting after the operation of the SW 1 (hereinafter referred to as "the SW 2").

The camera control unit 141 determines a lens driving amount based on a defocus amount output from the focus detection signal processing unit 125 and reliability of the defocus amount. Then, the lens driving amount is transmitted to the lens control unit 117 and the focus control unit 116, thereby implementing automatic focusing. Also, based on the instruction from an operator or a magnitude of the image signal temporarily stored in the SDRAM 136, the camera control unit 141 determines an accumulation time in the image pickup device 121, a gain setting value of the CDS/AGC/AD converter 123, and a setting value of the timing generator 122.

Configuration of Image Pickup Device

Figure 2:
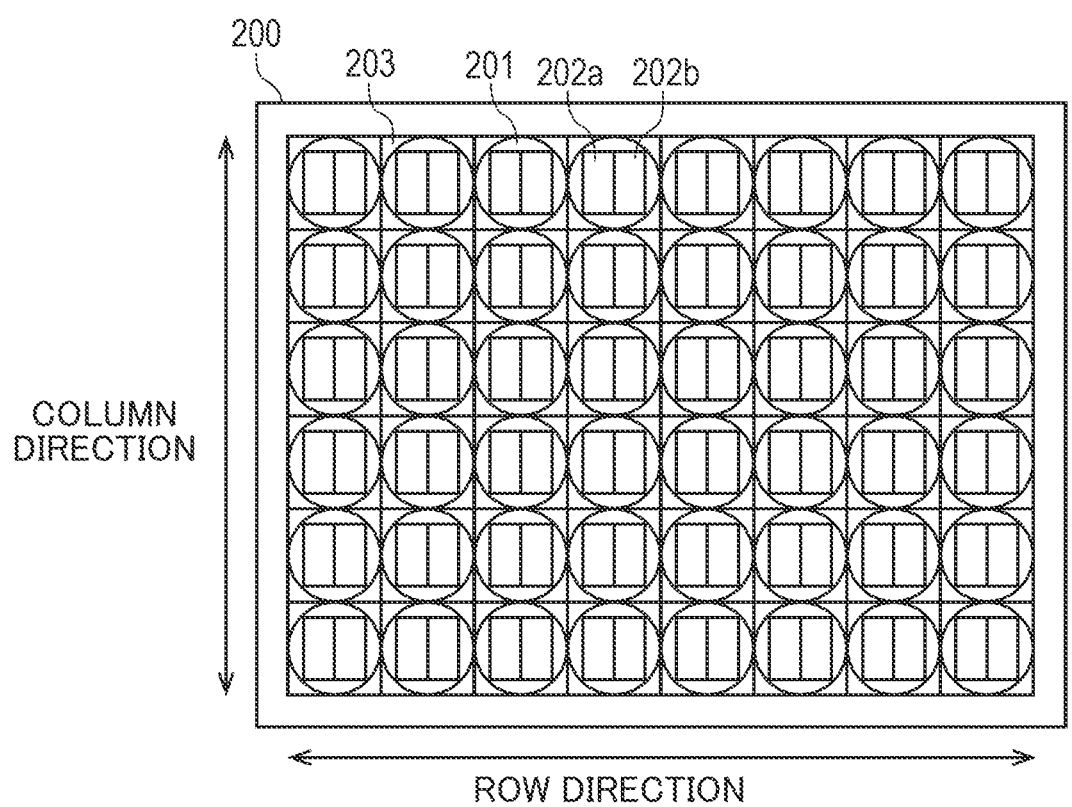
FIG. 2 is a pixel arrangement view in an image pickup device.

Next, a configuration of the image pickup device 121 will be described with reference to FIG. 2. FIG. 2 shows a pixel array 200 of the image pickup device 121. In FIG. 2, the pixel array 200 has a configuration in which unit pixels 203 are two-dimensionally arranged in a matrix direction. Each unit pixel 203 has a configuration in which photodiodes 202a and 202b as photoelectric conversion units are arranged under a single microlens 201. This configuration allows the photodiodes 202a and 202b to receive a light flux that has passed through different pupil areas of the image pickup optical system. Therefore, separate images having different phase differences of the same subject are subjected to incident. These two separate images having different phase differences of the same subject are referred to as an image A and an image B, respectively. The photodiode 202a constitutes the photoelectric conversion unit for the image A, whereas the photodiode 202b constitutes the photoelectric conversion unit for the image B.

[Operation Flow of Image Pickup Apparatus]

Figure 3:
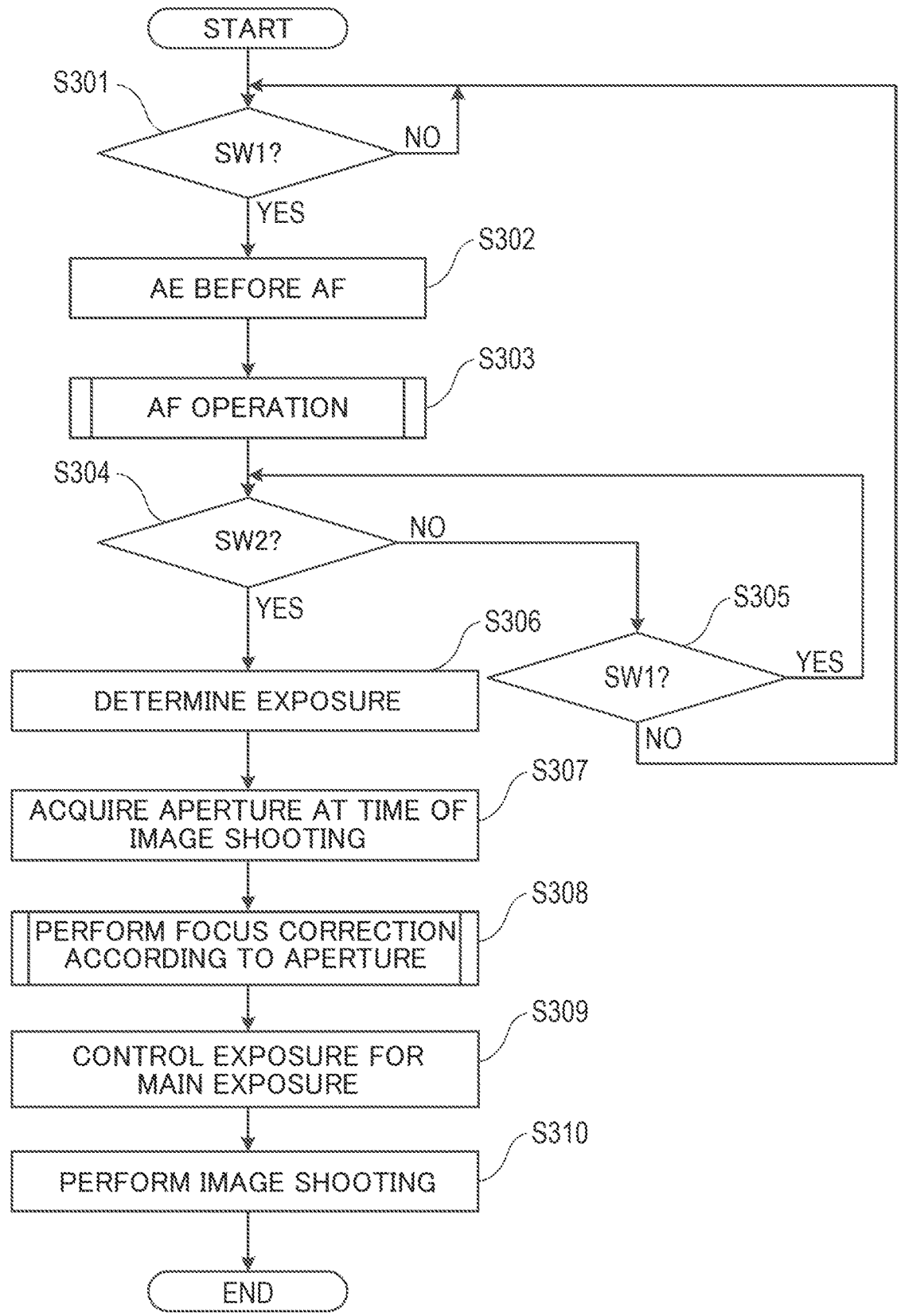
FIG. 3 is a flowchart showing an image pickup operation.

FIG. 3 is a flowchart describing the operation of the image pickup apparatus. First, in step S301, a state of the switch SW 1 is determined. When the switch SW 1 is pressed (when ON), the process proceeds to step S302. On the other hand, when the switch SW 1 is not pressed (when OFF), step S301 is repeated. In step S302, an AE process (automatic exposure process) is performed based on an output from the image pickup signal processing unit 124. The AE process in step S302 is performed for the subsequent AF operation. In addition, in order to perform focus correction (correction of a focus position) according to an aperture (f number) to be described later, the aperture at this time (AF aperture: a first aperture) is stored in the SDRAM 136 in step S302.

Subsequently in step S303, an AF operation (AF process) is performed. Exposure conditions during the AF operation (shutter speed, aperture, sensitivity) are determined by the AE process performed in the immediately preceding step S302. It should be noted that details of step S303 will be described later, but in the AF operation of S303, the focus lens is moved to a focus position (S510 of FIG. 5) taking into consideration optical defocusing (defocusing caused by lens aberration). In this way, by moving the focus lens to the focus position taking the optical defocusing into consideration at a time of AF operation, it is possible to maintain a state in which focus is constantly achieved during live view display (LV).

Subsequently in step S304, a state of the switch SW 2 is determined. When the switch SW 2 is pressed (when ON), the process proceeds to step S306 and moves to the image shooting operation. On the other hand, when the switch SW 2 is not pressed (when OFF), the process proceeds to step S305. Then, in step S305, the state of the switch SW 1 is determined. When the switch SW 1 is pressed (when ON), the process returns to step S304. On the other hand, when the switch SW 1 is not pressed, the process returns to step S301.

In step S306, an exposure at the time of image shooting is determined. In step S307, the aperture (second aperture) at the time of image shooting is acquired. Subsequently in step S308, focus correction (correction of the focus position) is performed according to the aperture (change in the aperture at a time of AF and the aperture at the time of image shooting). Details of step S308 will be described later.

Subsequently in step S309, exposure control for main exposure is performed. Then, image shooting is performed in step 5310, and this flow ends.

[Operation Flow of AF Process]

Figure 4:
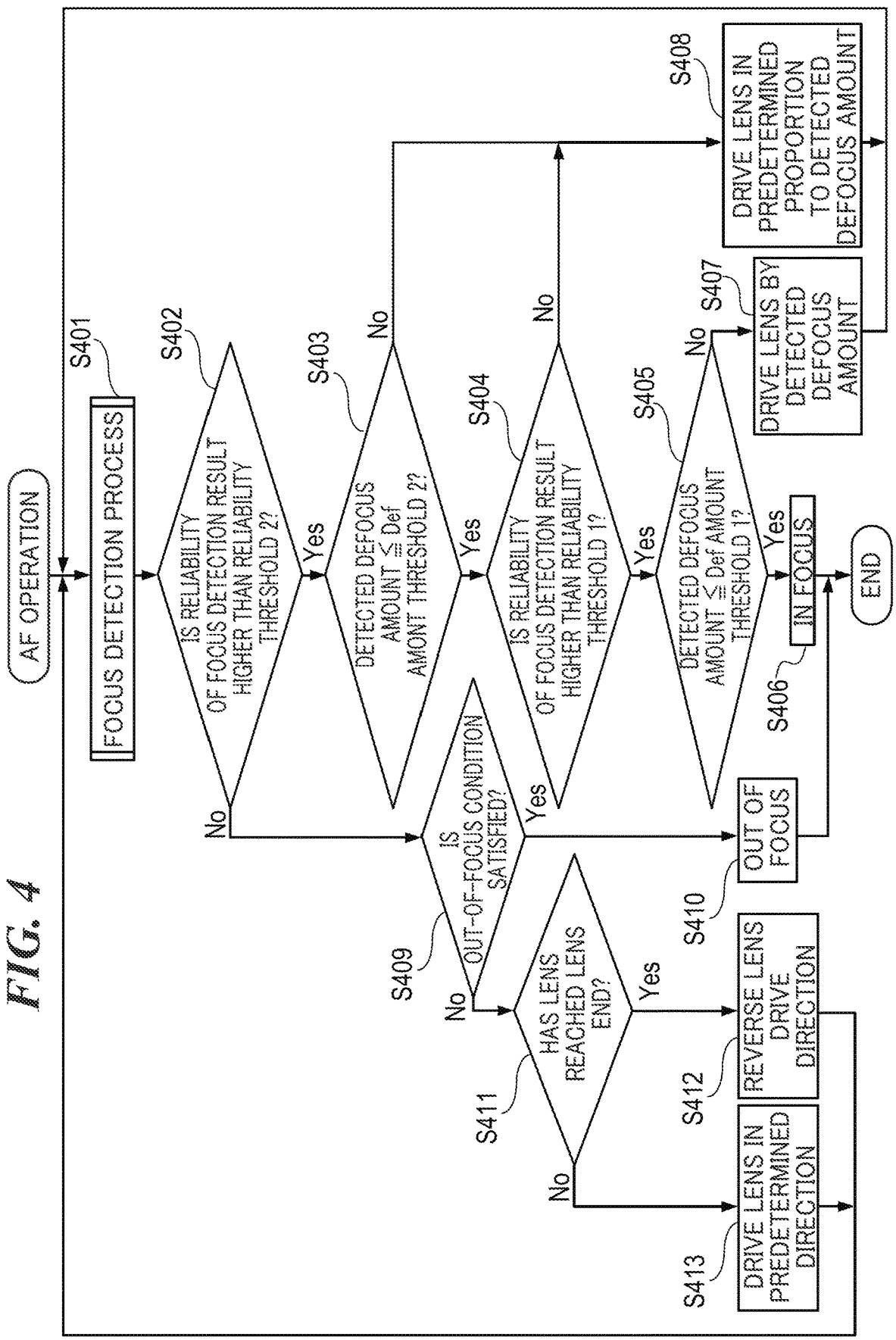
FIG. 4 is a flowchart showing an AF operation.

FIG. 4 is a flowchart describing the AF operation of S303 in FIG. 3.

First, in step S401, a focus detection process is performed to detect the defocus amount and the reliability, and then the process proceeds to step S402. The focus detection process will be described later.

In step S402, it is checked whether the reliability of a focus detection result detected in step S401 is higher than a preset reliability threshold 2. If the reliability is higher than the reliability threshold 2, the process proceeds to step S403, and otherwise, the process proceeds to step S409. Here, the reliability threshold 2 is set at a threshold at which the accuracy of the defocus amount cannot be guaranteed if the reliability is less than the reliability threshold 2, but a defocus direction indicating a direction in which the focus position of the subject is considered to exist can be guaranteed.

In step S403, it is checked whether the defocus amount detected in step S401 is equal to or less than a preset Def amount threshold 2. If the defocus amount is equal to or less than the Def amount threshold 2, the process proceeds to step S404, and otherwise, the process proceeds to step S408. Here, the Def amount threshold 2 is set at a value that allows the focus lens to be controlled within a focal depth (for example, five times the focal depth), only within a predetermined number of times (for example, three times), in accordance with the defocus amount if the defocus amount is equal to or less than the Def amount threshold 2.

In step S404, it is checked whether the reliability of the result detected in step S401 is higher than a preset reliability threshold 1. If the reliability is higher than the reliability threshold 1, the process proceeds to step S405, and otherwise, the process proceeds to step S408. Here, the reliability threshold 1 is set such that accuracy variation of the defocus amount is within a predetermined range (for example, within the focal depth) if the reliability is equal to or higher than the reliability threshold 1. A relationship between the reliability threshold 1 and the reliability threshold 2 satisfies: reliability threshold 2<reliability threshold 1.

In step S405, it is checked whether the defocus amount detected in step S401 is equal to or less than a preset Def amount threshold 1. If the defocus amount is equal to or less than the Def amount threshold 1, the process proceeds to step S406, and otherwise, the process proceeds to step S407. Here, the Def amount threshold 1 is set at a value that allows the focus lens to be controlled within the focal depth if the detected defocus amount is equal to or less than the Def amount threshold 1. Def amount threshold 1<Def amount threshold 2 holds.

In S406, it is determined to be in focus, and this flow ends. In step S407, the focus lens 114 is driven by the defocus amount detected in step S401, and then the process proceeds to step S401.

In step S408, the focus lens 114 is driven in a predetermined proportion to the defocus amount detected in step S401, and the process proceeds to step S401. The predetermined proportion here is set such that the lens driving amount is smaller than the defocus amount (for example, 80%). A lens speed to be set is set, for example, so as to be slower than a speed at which the lens can be driven exactly in one frame time. This makes it possible to prevent the lens from exceeding the subject focus position when the detected defocus amount is incorrect.

In S409, it is checked whether an out-of-focus condition is satisfied. If the out-of-focus condition is satisfied, the process proceeds to step S410, and otherwise, the process proceeds to step S411. Here, the out-of-focus condition is a condition for determining that there is no subject to be focused. For example, as the out-of-focus condition, a condition is set in which the lens driving is completed in all movable range of the focus lens 114, that is, the focus lens 114 detects lens ends of both a far side and a near side and returns to an initial position.

In step S410, it is determined to be out of focus, and this flow ends. In step S411, it is checked whether the focus lens 114 has reached the lens end on an infinite side or a close side. When the focus lens 114 has reached the lens end, the process proceeds to step S412, and otherwise, the process proceeds to step S413.

In step S412, a drive direction of the focus lens 114 is reversed and the process proceeds to step S401. In step S413, the focus lens 114 is driven in a predetermined direction, and the process proceeds to step S401. The focus lens speed is set, for example, at the fastest speed within a range of the lens speed such that the focus lens 114 does not pass through the focus position at a time when the defocus amount can be detected.

[Operation Flow of Focus Detection Process]

Figure 5:
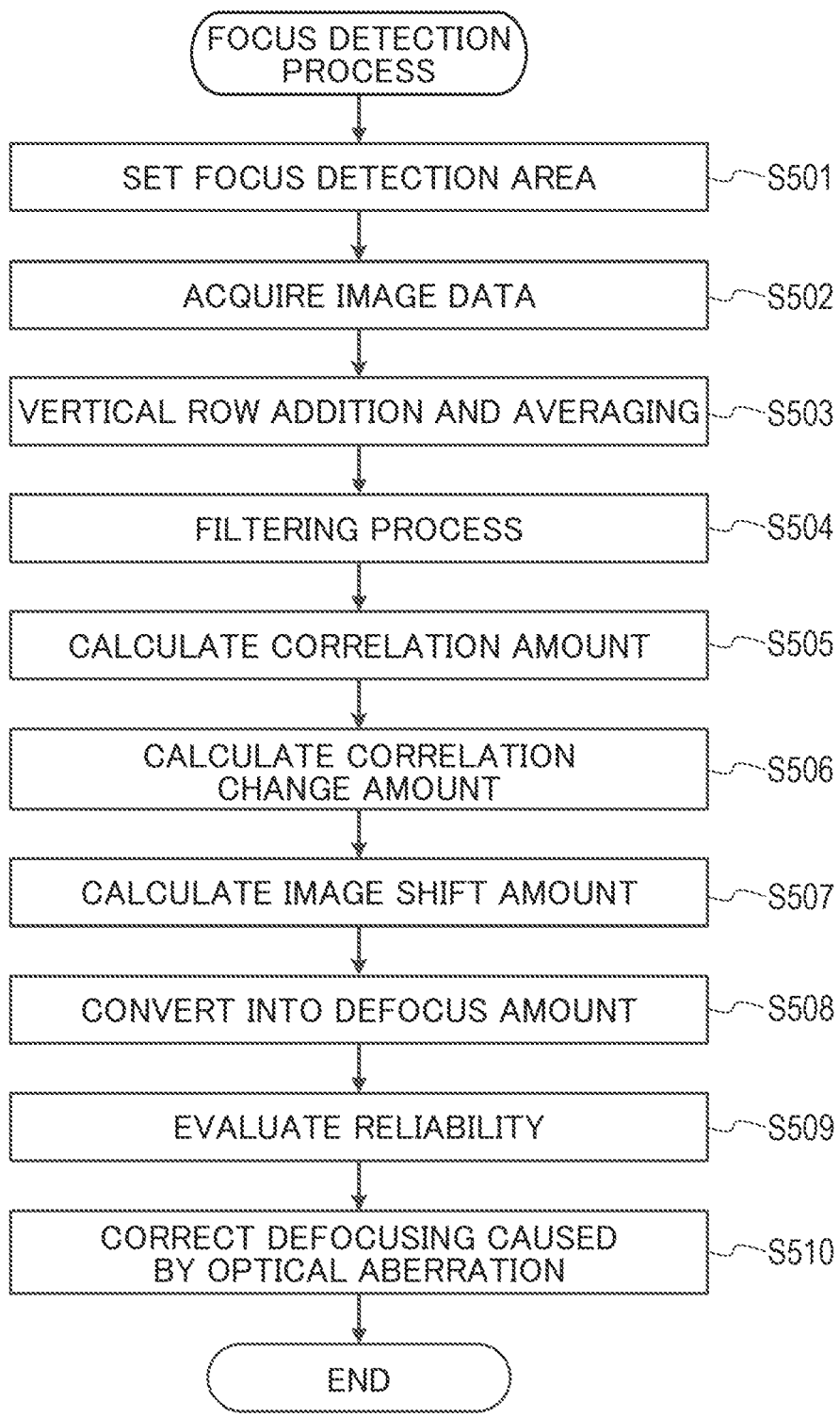
FIG. 5 is a flowchart showing a focus detection process.

Next, the focus detection operation of step S401 in FIG. 4 will be described with reference to FIG. 5. First, in step S501, a focus detection area in an arbitrary range in the image pickup device 121 is set, and the process proceeds to step S502. In step S502, a pair of picture signals for focus detection (image A and image B) is acquired from the image pickup device 121 for the focus detection area set in step S501, and the process proceeds to step S503.

In step S503, a vertical row addition and averaging process is performed on the pair of signals acquired in S502, and then the process proceeds to step S504. This process can reduce an influence of noise of the picture signals.

In step S504, a filtering process for extracting a signal component in a predetermined frequency band is performed from the signals that have undergone the vertical row addition and averaging in step S503, and then the process proceeds to step S505.

In step S505, a correlation amount is calculated from the signals that have undergone the filtering process in step S504, and the process proceeds to step S506. In step S506, a correlation change amount is calculated from the correlation amount calculated in step S505, and the process proceeds to step S507. In step S507, an image shift amount is calculated from the correlation change amount calculated in step S506, and the process proceeds to step S508.

In step S508, the image shift amount is multiplied by a conversion factor and converted into the defocus amount, and the process proceeds to step S509. This conversion factor is stored in the image pickup apparatus 101 according to a zoom lens position, the aperture, and an image height of the image pickup surface (position in a screen of the focus detection area).

In step S509, reliability indicating how reliable the defocus amount calculated in step S508 is evaluated, and the process proceeds to step S510.

In step S510, the defocus amount is corrected using an optical defocusing correction amount (corresponding to L2-L1 in FIG. 6 to be described later) stored in the ROM 137, and the focus detection process ends. The optical defocusing is caused by a difference between an image used for focus detection and a spatial frequency of a still image obtained by a user. In the present embodiment, the correction amount is stored in advance according to the zoom lens position, the aperture, the image height of the image pickup surface, and a distance to the subject.

[Method for Calculating Correction Amount According to Aperture Change]

Figure 6:
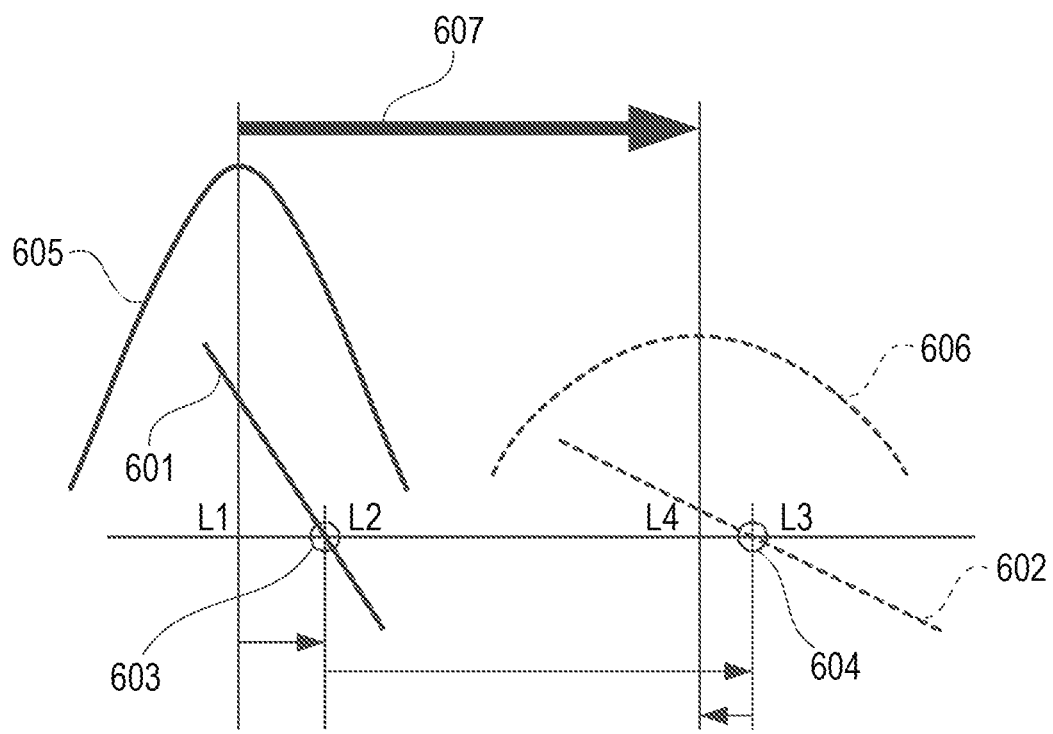
FIG. 6 is a schematic view of focus correction by means of an aperture difference.

Next, a method for calculating the correction amount according to the aperture change in step S308 will be described with reference to FIGS. 6 to 8.

First, an outline of correction according to the aperture change will be described with reference to FIG. 6. A horizontal axis of FIG. 6 represents the focus lens position, whereas a vertical axis represents the change in the image shift amounts 601 and 602 calculated in step S507, and the change in high-frequency components 605 and 606 of a luminance signal. Solid lines 601 and 605 and broken lines 602 and 606 represent evaluation values of the aperture at the time of AF (for example, open F), and evaluation values of the aperture at the time of image shooting (for example, F16), respectively. Points (603 and 604) at which the image shift amounts become 0 (hereinafter referred to as "the zero-cross points") are regarded as positions where focus is achieved by the phase difference method AF.

Since the high-frequency components 605 and 606 of the luminance signal are extracted from the same non-added image as the still image, a state where the high-frequency components 605 and 606 of the luminance signal reach a peak means that focus is best achieved in the still image (best focus). The lens positions (L1 and L4) are set as the best focus positions of the focus lens. Here, differences between the zero-cross points (L2 and L3) and positions where the high-frequency components of the luminance signal peak are the above-mentioned optical defocusing.

As will be described later with reference to FIGS. 7A to 7C, in the present embodiment, at a time of individual adjustment, the image shift amounts 601 and 602 and the high-frequency components 605 and 606 of the luminance signal are measured by bracket shooting, and the optical correction amounts (L2-L1 and L3-L4) and the difference between the zero-cross points of the respective apertures (L3-L2) are calculated. These correction amounts are stored in the ROM 137.

In the AF operation, only the change in the image shift amount 601 is acquired, and focus correction is performed using the correction values written in the ROM 137.

Next, a method for adjusting the correction amount and a storage state will be described with reference to FIGS. 7A to 7C. This storage is performed at a time of factory adjustment and the like, and is read and used during the image pickup operation in the image pickup apparatus. FIG. 7A shows a state for writing the optical correction amounts (L2-L1 and L3-L4) in the ROM 137, in which a vertical axis represents the aperture, whereas a horizontal axis represents the zoom lens position. In the present embodiment, in addition to the above-mentioned state, the optical correction amount is also stored for each subject distance and the image height of the image pickup surface.

Figures 7A, 7B, 7C:
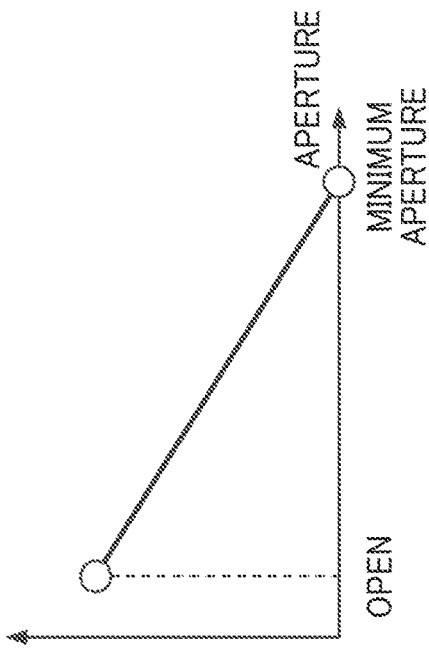
FIGS. 7A to 7C are graphs each showing a storage state of the focus correction and an interpolation method
Figure 8:
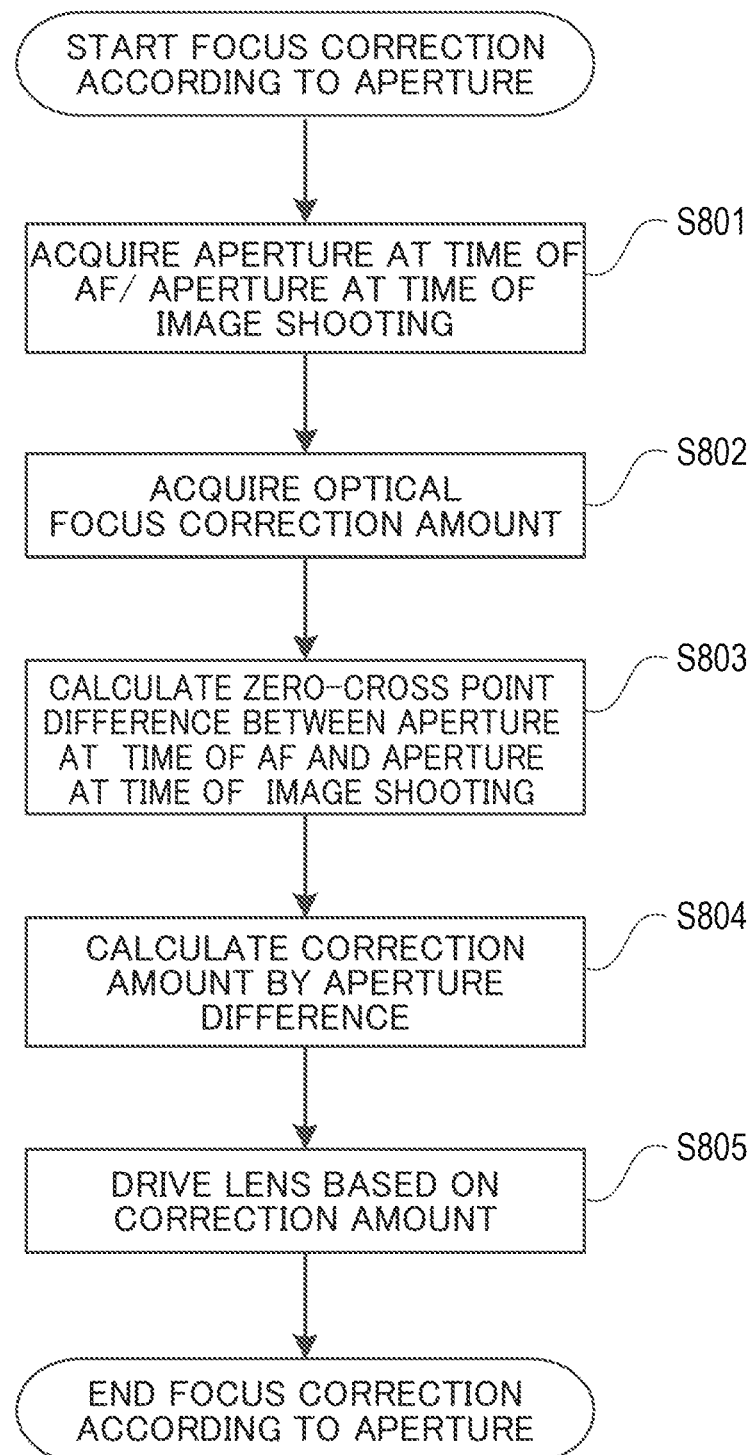
FIG. 8 is a flowchart showing a focus correction process by means of the aperture difference.

A circle in FIG. 7A shows a state for calculating the optical focus correction amount by actual measurement. In the present embodiment, in order to shorten the individual adjustment time, the evaluation values (601 and 605, or 602 and 606) for calculating the optical correction amount only for the open aperture are actually measured for each zoom lens position. The optical correction amount at the other apertures (triangle in FIG. 7A) is created by linear interpolation.

A cross in FIG. 7A is an aperture that cannot be set because of lens structure. The aperture cannot be set because the open aperture differs depending on each zoom state. A specific method for the linear interpolation is that the optical correction amount is created by interpolating the correction amounts of the open aperture and the minimum aperture by regarding the correction amount for the minimum aperture as 0, as shown in FIG. 7B. It should be noted that the method for creating the optical focus correction amount is not limited to the above method, and the optical focus correction amount may be calculated by simulation or the like.

FIG. 7C shows a state in which the zero-cross difference for each aperture is recorded. As described above, since the zero-cross difference allows actual measurement of the correction amount in a short time, the state indicated by the circle is actually measured. In the present embodiment, since the zero-cross difference between the open aperture and each aperture is stored in the ROM 137, the state of the open aperture is described as a cross. However, the method for storing the correction amount is not limited to the method for the present embodiment, and a difference from another aperture may be used.

[Operation Flow of Focus Correction Process According to Aperture]

A specific process flow of focus correction according to the aperture in S308 will be described below with reference to the flowchart of FIG. 8.

In step S801, the aperture at the time of AF that is set in step S302 and stored in the SDRAM 136, and the aperture at the time of image shooting acquired in step S307 are acquired again. In step S802, the optical focus correction amount for the aperture at the time of AF acquired in step S801 and the aperture at the time of image shooting are acquired from the ROM 137. In step S803, the difference between the zero-cross points is acquired for the two apertures. In the present embodiment, the difference Diff_ZeroCrossOpen (FNo) between the zero-cross points for the open aperture and each aperture is stored in advance in the ROM 137, and the difference Diff_ZeroCross between the zero-cross points for the AF aperture and the image shooting aperture is calculated by the following formula. It should be noted that FNo means the aperture. In the present embodiment, the difference between the zero-cross points is stored according to the aperture, the zoom lens position, the subject distance, and the image height of the image pickup surface.

Diff_ZeroCross=Diff_ZeroCrossOpen (FNo_Cap)−
Diff_ZeroCrossOpen (FNo_AF)  (formula 1).

FNo_Cap refers to the aperture at the time of image shooting, and FNo_AF refers to the aperture at the time of AF. In step S804, the focus correction amount is calculated based on the difference between the aperture at the time of AF and the aperture at the time of image shooting. The focus correction amount for the aperture difference is calculated by, first, adding Diff_ZeroCross (L3-L2) to the optical focus correction amount for the aperture at the time of AF (L2-L1), and subtracting the optical focus correction amount for the aperture at the time of image shooting (L3-L4) therefrom. It should be noted that although the formula of the correction amount has been conceptually described here for the description of FIG. 6, in actual use, the correction amount is calculated in consideration of a sign of the correction amount possessed and a sign of the lens driving direction. By performing the process like this, it is possible to perform the correction from L1 toward L4, and as a result, it is possible to calculate the same amount of correction amount as the correction amount 607.

Finally, in step S805, the correction amount is converted into the focus lens driving amount to drive the focus lens, and the process ends.

It should be noted that in the present embodiment, the process of moving the focus lens to L1 is performed in step S303 of FIG. 3 in consideration of the focus accuracy during the live view display (LV). However, at the time of AF operation, the focus lens may be moved to L2, and the correction may be performed from L2 to L4 in step S308. In this case, the optical focus correction amount (L3-L4) of the aperture at the time of image shooting may be subtracted from Diff_ZeroCross (L3-L2). It should be noted that although the formula of the correction amount has also been conceptually described here for the description of FIG. 6, in actual use, the correction amount is calculated in consideration of a sign of the correction amount possessed and a sign of the lens driving direction.

In the present embodiment, the focus correction amount by the aperture difference is calculated in step S308 immediately before the image pickup. However, the timing of calculating the correction amount is not limited to the above timing. The focus correction amount may be calculated and written in the ROM 137 when the zero-cross point of each aperture is actually measured.

In the present embodiment, the focus correction is performed based on the aperture difference between the aperture at the time of AF and the aperture at the time of image shooting, but the correction is not limited to correction at the time of AF. For example, when a user manually sets the focus lens while viewing the LV screen (MF), in a case where the aperture differs between the live view (LV) display and image shooting, the focus correction is performed based on the aperture difference.

As described above, the present embodiment performs defocusing correction of the aperture difference by using the optical correction amounts for the apertures at the time of AF and at the time of image shooting (L2-L1 and L3-L4), and the difference between the zero-cross points for each aperture (L3-L2). These correction amounts can be calculated by linear approximation using minimum two points. Therefore, concerns of (1) and (2) described in [Problems to be Solved by the Invention] are small. Also, since the vertical resolution is not necessary for the phase difference method AF of the present embodiment, it is not necessary to read a non-added image in the vertical direction as in (3).

This makes it possible to prevent prolonged adjustment time in the factory adjustment with degraded productivity. Furthermore, in a lens-attached image pickup apparatus or the like, since an adjustment can be made in a short time after a housing is assembled, it is also possible to prevent an adjustment value from shifting.

Each of the embodiments described above has described an example in which the present invention is applied to a digital camera, but the present invention is not limited to this example. That is, the present invention may be applied to any apparatus including the image pickup device. That is, the present invention is applicable to any apparatus capable of performing image pickup, such as a mobile phone terminal, a portable image viewer, a television with a camera, a digital photo frame, a music player, a game machine, and an electronic book reader.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181112, filed Sep. 21, 2017 which is hereby incorporated by reference wherein in its entirety.

What is claimed is:

1. An image pickup apparatus comprising:
an image pickup device configured to photoelectrically convert a light flux having passed through mutually different pupil areas of an image pickup optical system including a focus lens to output a pair of picture signals;
a focus detection signal processor configured to detect an image shift amount based on the pair of picture signals by a phase difference AF method;
a diaphragm controller configured to control an aperture of a diaphragm included in the image pickup optical system;
a first storage configured to store a first correction amount for correcting optical defocusing caused by an aberration of the image pickup optical system in accordance with the aperture;
a second storage configured to store a difference between a position of the focus lens at which the image shift amount in the phase difference AF becomes zero for a predetermined aperture, and a position of the focus lens at which the image shift amount in the phase difference AF becomes zero for each aperture; and
a processor configured to calculate, when a first aperture at a time of a focus detection operation for detecting the image shift amount by the focus detection signal processor differs from a second aperture at a time of an image shooting operation for recording an image signal acquired from the image pickup device, a second correction amount of the position of the focus lens due to a difference between the first aperture and the second aperture, by using the first correction amount acquired from the first storage and the difference in the positions of the focus lens at which the image shift amount in the phase difference AF becomes zero between the first aperture and the second aperture acquired from the second storage.

2. The image pickup apparatus according to claim 1, further comprising a focus controller configured to control movement of the focus lens, wherein the processor is further configured to convert the image shift amount into a defocus amount, and wherein after correcting the defocus amount obtained in the focus detection operation based on the first correction amount for the first aperture acquired from the first storage and moving the focus lens, the focus controller is configured to move the focus lens based on the second correction amount of the position of the focus lens by the difference between the first aperture and the second aperture in the image shooting operation.

3. The image pickup apparatus according to claim 1, wherein the first storage is configured to store the first correction amount according to at least one of a zoom lens position, an image height of an image pickup surface, and a distance to a subject.

4. The image pickup apparatus according to claim 1, wherein the second storage is configured to store the difference according to at least one of a zoom lens position, an image height of an image pickup surface, and a subject distance.

5. A method for controlling an image pickup apparatus including an image pickup device capable of photoelectrically converting a light flux having passed through mutually different pupil areas of an image pickup optical system including a focus lens to output a pair of picture signals, the method comprising:

detecting an image shift amount based on the pair of picture signals by a phase difference AF method;

controlling an aperture of a diaphragm included in the image pickup optical system;

storing a first correction amount for correcting optical defocusing caused by an aberration of the image pickup optical system in accordance with the aperture;

storing a difference between a position of the focus lens at which the image shift amount in the phase difference AF becomes zero for a predetermined aperture, and a position of the focus lens at which the image shift amount in the phase difference AF becomes zero for each aperture; and calculating, when a first aperture at a time of a focus detection operation for detecting the image shift amount differs from a second aperture at a time of an image shooting operation for recording an image signal acquired from the image pickup device, a second correction amount of the position of the focus lens due to a difference between the first aperture and the second aperture, by using the stored first correction amount and the stored difference in the positions of the focus lens at which the image shift amount in the phase difference AF becomes zero between the first aperture and the second aperture.

* * * * *